United States Patent [19]

Dunn

[11] 4,131,694
[45] Dec. 26, 1978

[54] COMPOSITE BODY AND METHOD OF FORMING

[75] Inventor: Bruce S. Dunn, Schenectady, N.Y.

[73] Assignee: General Electric Company, Schenectady, N.Y.

[21] Appl. No.: 890,595

[22] Filed: Mar. 20, 1978

Related U.S. Application Data

[62] Division of Ser. No. 852,242, Nov. 17, 1977.

[51] Int. Cl.² .......................... B05D 5/12; H01M 6/20
[52] U.S. Cl. ........................................ 427/126; 427/58; 429/193
[58] Field of Search .................. 429/193, 191, 104; 427/58, 126, 383 D, 115; 428/539, 131, 137

[56] References Cited

U.S. PATENT DOCUMENTS

| | | | |
|---|---|---|---|
| 3,939,007 | 2/1976 | Sudworth | 429/193 |
| 3,985,576 | 10/1976 | Lingscheit et al. | 429/174 |
| 4,037,028 | 7/1977 | Mehaute et al. | 429/191 |
| 4,048,391 | 9/1977 | Tilley et al. | 429/191 |
| 4,049,889 | 9/1977 | Heintz | 429/174 |

Primary Examiner—Ronald H. Smith
Assistant Examiner—Richard Bueker
Attorney, Agent, or Firm—Paul R. Webb, II; Joseph T. Cohen; Leo I. MaLossi

[57] ABSTRACT

A composite body is described which comprises a body of solid ion-conductive electrolyte material, the body having a casing portion with one open end and a header integral with the casing adjacent its open end, and a surface portion of an ion-insulating material on only the exterior surfaces of the header portion of the body. A method of forming such a composite body is also described.

3 Claims, 1 Drawing Figure

U.S. Patent      Dec. 26, 1978      4,131,694
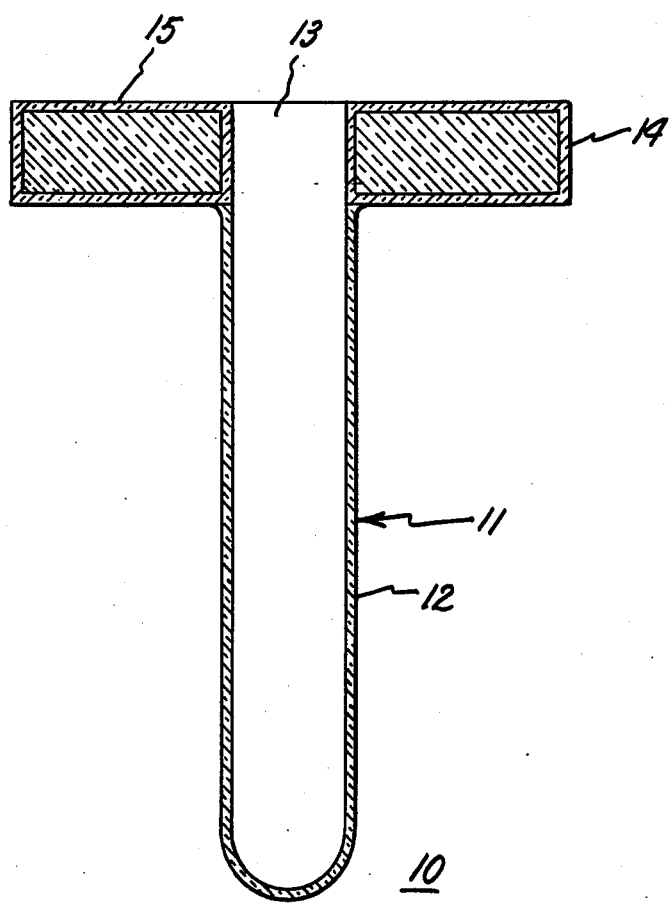

COMPOSITE BODY AND METHOD OF FORMING

This is a division of application Ser. No. 852,242, filed Nov. 17, 1977.

The present invention relates to a composite body, and to a method of forming the composite body, and is more particularly concerned with an improved composite body with a solid ion-conductive electrolyte material, and a surface portion of an ion-insulating material on only a limited part of the body, and an improved method of forming the composite body.

Reference is made to copending patent application Ser. No. 807,377, filed June 17, 1977, and entitled "Composite Body, Method of Forming, And Method of Bonding" which describes a composite body comprising a solid ion-conductive electrolyte material, and a surface portion of an ion-insulating material.

Reference is made to copending patent application Ser. No. 807,406, filed June 17, 1977, now U.S. Pat. 4,109,063, and entitled "Composite Body" which describes a composite body including a substrate of a solid ion-conductive electrolyte material, at least a portion of at least one major surface of a solid ion-insulating material region, and a moderately deformable material of the substrate.

Both of these applications are assigned to the same assignee as the present application.

In "Ion Exchange Properties of and Rates of Ionic Diffusion in Beta-Alumina" by Y. Yao et al, "Journal of Inorganic Nuclear Chemistry", Volume 29, pages 2453-2475, 1967, there is described that the sodium ion in beta-alumina powders and crystals have been exchanged in molten salts with a number of univalent and divalent ions.

My present invention is directed to a composite body and to a method of forming such a composite body which has a body of solid ion-conductive electrolyte material, the body having a casing portion with one open end and a header integral with the casing adjacent its open end, and a surface portion of an ion-insulating material on only the exterior surfaces of the header portion of the body as opposed to the above-identified patent applications, and as opposed to the above Y. Yao et al. article which describes only exchange of the sodium ion in beta-alumina powders and crystals in molten salts with a number of univalent and divalent ions.

The primary object of my invention is to provide a composite body which is useful as a unitary electrolyte and header in a sodium-sulfur battery. Such a sodium-sulfur battery is described in U.S. Pat. No. 3,960,596 — Mitoff et al., entitled "Battery Casing and Hermetically Sealed Sodium-Sulfur Battery". This patent is assigned to the same assignee as the present application.

In accordance with one aspect of my invention, a composite body comprises a body of solid ion-conductive electrolyte material, the body having a casing portion with one open end and a header integral with the casing adjacent its open end, and a surface portion of an ion-insulating material on only the exterior surfaces of the body.

These and various other objects, features, and advantages of the invention will be better understood from the following description taken in connection with the accompanying drawing in which:

The single FIGURE is a sectional view of a composite body made in accordance with my invention.

In the single FIGURE of the drawing, there is shown generally at 10 a composite body made in accordance with my invention. Composite body 10 has a body 11 of solid ion-conductive electrolyte material of sodium beta-alumina. Body 11 has a casing portion 12 with one open end 13 and a header 14 integral with casing 12 adjacent its open end 13. A surface portion 15 of an ion-insulating material on only the exterior surfaces of header portion 14 of body 11. Ion-insulating material 12 is a strontium substituted ion beta-alumina.

Generally, the use of a solid ion-conductive electrolyte material, such as, beta-alumina, beta"-alumina or mixtures thereof, is based upon its excellent ionic conductivity. However, the header in a sodium-sulfur battery should have the resistivity of its surface portion of the beta-alumina increased without altering its mechanical or physical properties.

I found that I could form a composite body which is useful as a unitary electrolyte and header comprising a solid ion-conductive electrolyte material, and a surface portion of an ion-insulating material on only the exterior surfaces of the header. The header portion is sodium resistant and has a coefficient of thermal expansion similar to the beta-alumina electrolyte or casing portion thus eliminating mechanical stresses arising from a thermal expansion mismatch with the beta-alumina casing employed in a sodium-sulfur battery.

I found that my method would form a composite body which has a solid ion-conductive electrolyte material, and a surface portion of an ion-insulating material on only the exterior surface of the header. My method comprises providing a solid ion-conductive electrolyte material, such as, sodium beta-alumina, as a body having a casing portion with one open end and a header portion integral with the casing adjacent its open end. Only the header portion of the body is submerged in a molten salt bath of a salt containing a divalent substitution ion, such as, a strontium$^{++}$ion, and the surface portion of only the header portion is converted to an ion-insulating material, such as, a strontium substituted ion beta-alumina thereby providing a composite body.

I found that a surface portion of an ion-insulating material can be formed on the solid ion-conductive electrolyte material of only the header portion of the body to form the composite body of my invention. The ion-insulating material is formed by an ion exchange process wherein a divalent ion, for example, of calcium, magnesium, strontium or barium is substituted for two sodium ions. This exchange is accomplished by immersing or submerging the only sodium beta-alumina header portion of the body in a molten bath which contains the desired ions in the form of the nitrates, chlorides, iodides, etc. of calcium, magnesium, strontium, or barium. The depth of penetration of the divalent ion is dependent upon the nature of the ion, the composition of the salt bath, and the temperature and time conditions of the process or treatment.

Quantitative results are obtained by measuring the change in sample weight as a function of time and temperature. Preliminary results in a semilogarithmic plot enables one to calculate an activation energy for ion motion. The large values indicate the insulating nature of the surface layer. A simple ratio of these activation energies with that of Na$^+$($\sim$4 kcal/mole) implies that the resistivities for the Ca$^{2+}$and Sr$^{2+}$surfaces are greater than that of beta-alumina by factors of $10^3$ and $10^5$ respectively. The total resistance of the exchanged beta-alumina material will depend upon the divalent ion thickness layer and the sample dimensions overall.

The following Table I shows specific conditions of my method of converting only the surface portion or exterior surfaces of the header portion of the body.

TABLE I

| Exchange Ion | Bath Composition | Temperature |
|---|---|---|
| 1.) $Sr^{2+}$ | $3 \cdot Sr(NO_3)_2 \cdot NaNO_3$ | 600° C |
| 2.) $Ca^{2+}$ | $Ca(NO_3)_2 \cdot NaNO_3$ | 500° C |

| Time | Penetration Depth of Exchange Ion (calculated) |
|---|---|
| 1.) 1 hour | $70 \times 10^{-4}$ cm. |
| 2.) 1 hour | $160 \times 10^{-4}$ cm. |

Once the surface portion is altered, the high activation energy for ion motion ensures that this portion will remain stable even when subjected to molten sodium at 300° C. for prolonged periods. The resistive surface portion will prevent any self-discharge of the cell in areas exposed to the atmosphere.

Examples of composite bodies, and methods of forming composite bodies which are in accordance with my invention are set forth:

EXAMPLE I

A solid ion-conductive electrolyte material body of sodium beta-alumina is provided which body includes a casing portion with one open end and a header portion integral with the casing portion adjacent its open end. A bath composition of $3 \cdot Sr(NO_3)_2 \cdot NaNO_3$ is in molten condition at a temperature of 600° C. The molten bath contains a divalent substitution ion of $Sr^{2+}$ which ion is to be exchanged into the surface portion of the header portion of the body. The header portion is submerged into the molten bath for a period of one hour thereby converting the surface portion or exterior surfaces of the header portion to an ion-insulating material of strontium substituted beta-alumina. The penetration depth of the strontium divalent ion is calculated to be $70 \times 10^{-4}$ cm. This method and the resulting composite body are made in accordance with my invention.

EXAMPLE II

A solid ion-conductive electrolyte material body of sodium beta-alumina is provided which body includes a casing portion with one open end and a header portion integral with the casing portion adjacent its open end. A bath composition of $Ca(NO_3)_2 \cdot NaNO_3$ is in molten condition at a temperature of 500° C. The molten bath contains a divalent substitution ion of $Ca^{2+}$ which ion is to be exchanged into the surface portion of the header portion of the body. The header portion is submerged into the molten bath for a period of one hour thereby converting the surface portion or exterior surfaces of the header portion to an ion-insulating material of calcium substituted beta-alumina. The penetration depth of the calcium divalent ion is calculated to be $160 \times 10^{-4}$ cm. This method and the resulting composite body are made in accordance with my invention.

While other modifications of the invention and variations thereof which may be employed within the scope of the invention have not been described, the invention is intended to include such as may be embraced within the following claims.

What I claim as new and desire to secure by Letters Patent of the United States is:

1. A method of forming a composite body which comprises providing a solid ion-conductive electrolyte material body having a casing portion with one open end and a header portion integral with the casing adjacent its open end, submerging the header portion of the body in a molten bath of a salt containing a divalent substitution ion, and converting the surface portion of only the header portion of the body to an ion-insulating material thereby providing a composite body.

2. A method as in claim 1, in which the divalent substitution ion is strontium $^{++}$ion.

3. A method as in claim 1, in which the divalent substitution ion is $Ca^{2+}$ion.

* * * * *